(No Model.)

E. ROSENBERGER.
CANDY MOLDING APPARATUS.

No. 502,864. Patented Aug. 8, 1893.

Witnesses:
Chas. E. Gaylord
Clifford N. White

Inventor:
Ernst Rosenberger,
By Dyrenforth & Dyrenforth,
Attys.

UNITED STATES PATENT OFFICE.

ERNST ROSENBERGER, OF CHICAGO, ILLINOIS.

CANDY-MOLDING APPARATUS.

SPECIFICATION forming part of Letters Patent No. 502,864, dated August 8, 1893.

Application filed November 26, 1892. Serial No. 453,270. (No model.)

*To all whom it may concern:*

Be it known that I, ERNST ROSENBERGER, a citizen of the United States, residing at Chicago, in the county of Cook and State of Illinois, have invented a new and useful Improvement in Candy-Molding Apparatus, of which the following is a specification.

My object is to provide new and improved apparatus for the manufacture of candy articles of the general class in which each piece or article is formed of one kind of candy surrounded by another.

In the use of my improved apparatus the candy articles are formed by first molding all but one side of the outer or crust portion, to form a receptacle, then pouring the filler into the receptacle thus formed, and afterward if desired molding a cap over the filler to form the balance of the crust and cause the filler to be completely enveloped.

Figure 7:
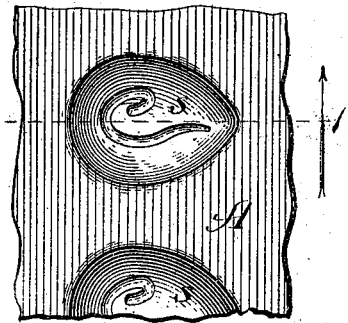
Figure 8:
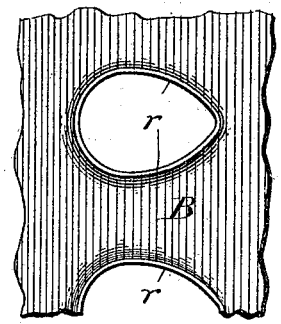
Figure 9:
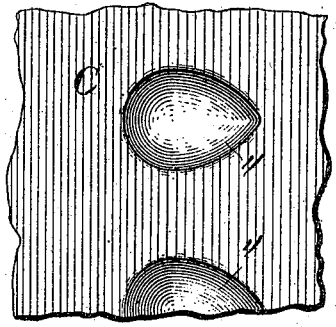
Figure 10:
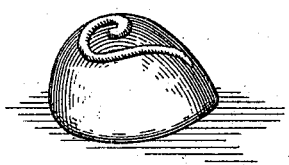

In the drawings—Figures 1 to 6 inclusive are broken sectional views illustrating the various steps in the manufacture of candy articles with my improved apparatus; Figs. 7, 8 and 9, broken plan views of parts of the apparatus; and Fig. 10, a view in perspective of the finished article.

The apparatus consists of molds each formed with a sectional core box and a core $t$, the sections consisting of a receptacle $s$, and a core-guide $r$ and preferably a smoothing plate or surface $q$. The receptacles may be of any desired number upon a thin continuous plate A, the receptacles or recesses being formed, by stamping the sheet, equidistant apart and as close together as practicable. The core guides are openings in a plate B, flanged around the edges of the openings, to project inward and slightly downward into the receptacles $s$ as shown, when the plate B is placed upon the plate A. The cores $t$ are formed upon a plate C in the same manner as the receptacles $s$. They are somewhat smaller than the receptacles and, when the plate C is placed upon the plate B, they register with and pass through the guides into the receptacles. The guides fit closely around the cores, and when in position the cores are out of contact at all points with the surfaces of the receptacles. The smoothing plates $q$, are also formed upon a continuous plate D; they register with and fit into the tops of the receptacles $s$, and are shallow, as shown, to project to a slight extent downward into the receptacles.

Figure 1:
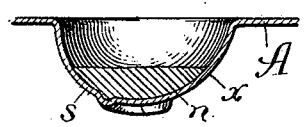
Figure 2:
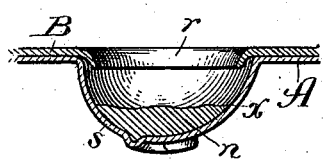
Figure 3:
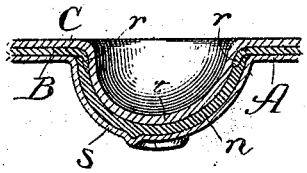
Figure 4:
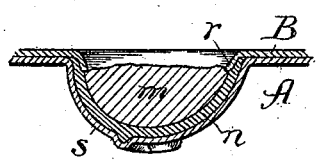
Figure 5:
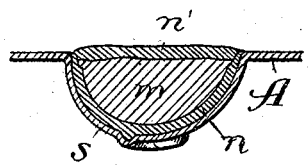
Figure 6:

In the use of my improved apparatus for example in the manufacture of chocolate-creams in which the chocolate candy is to form the shell or crust and the cream-candy the filler, the steps are as follows: Melted chocolate candy $n$ is poured in the receptacles $s$ to the depth indicated by the line $x$ in Figs. 1 and 2. When all the receptacles are thus charged, the plate B is placed in position as shown in Fig. 2. Then while the chocolate $n$ is still more or less fluid, the plate C is placed in position, causing the cores $t$ to pass through the guides $r$, and spread the chocolate evenly over the entire surfaces of the receptacles, to the edges of the plate B around the guide openings. The chocolate-candy is then allowed to harden, and when sufficiently hard, the plate C is raised to withdraw the cores out of the core guides. The edges of the core-guides, overlapping the edges of the receptacles, prevent the molded chocolate shells or crusts from adhering to and being withdrawn with the cores. The receptacles formed by the chocolate are then filled with liquid cream-candy $m$ up to the edges of the guides; and when the cream-candy has become sufficiently hard or plastic, the plate B is withdrawn. A small quantity of chocolate to form a cap $n'$ is then poured upon the filler in each receptacle, and the plate D may then be placed in position to cause the smoothing surfaces $q$ to compress and spread the chocolate evenly over the cream-candy. When the candy has hardened to the desired extent, the plates A and D are turned together upside-down and the plate A is raised to cause the finished articles to rest upon the plate D, whence they may be readily removed. When it is desired to form the filler of more than one kind of candy, the candies may be poured into the shell $n$ in the proper quantities one after the other until the shell is filled. When it is desired to form the candy articles with only the parts $n$ $m$, and without the part $n'$, the plate B may be raised from the plate A after the cores have been withdrawn, the filler $m$ poured into the top of the receptacle, and the smoothing surfaces $q$ pressed down upon the filler to produce an even surface of the latter.

The plates A, B, C, D, may be of any desired material though I prefer to employ celluloid for the purpose.

The receptacles $s$ may be formed to give any desired shape to the candy article, the other parts of the apparatus being constructed to co-operate with the receptacles provided. If desired the receptacles may be formed with ornamental patterns to increase the attractiveness of the articles molded therein.

The plate D affording the smoothing surfaces $q$ though desirable is not essential. When used, however, it has the effect of compressing the articles and forming smoother surfaces at the bases thereof than would otherwise be present.

What I claim as new, and desire to secure by Letters Patent, is—

1. Candy molding apparatus, comprising, in combination, a plate A provided with receptacles $s$, a plate D provided with core-guides $r$, and a plate C provided with cores $t$, the plates being adapted to fit one upon the other as described, and the parts carried thereby to co-operate substantially as set forth.

2. Candy molding apparatus comprising in combination a plate A provided with receptacles $s$, a plate B provided with core guides $r$, a plate C provided with cores $t$, and a plate D provided with smoothing surfaces $q$, the plates being adapted to fit one upon the other as described and the parts carried thereby to co-operate substantially as set forth.

ERNST ROSENBERGER.

In presence of—
M. J. FROST,
B. M. TAUSIG.